Patented Aug. 19, 1941

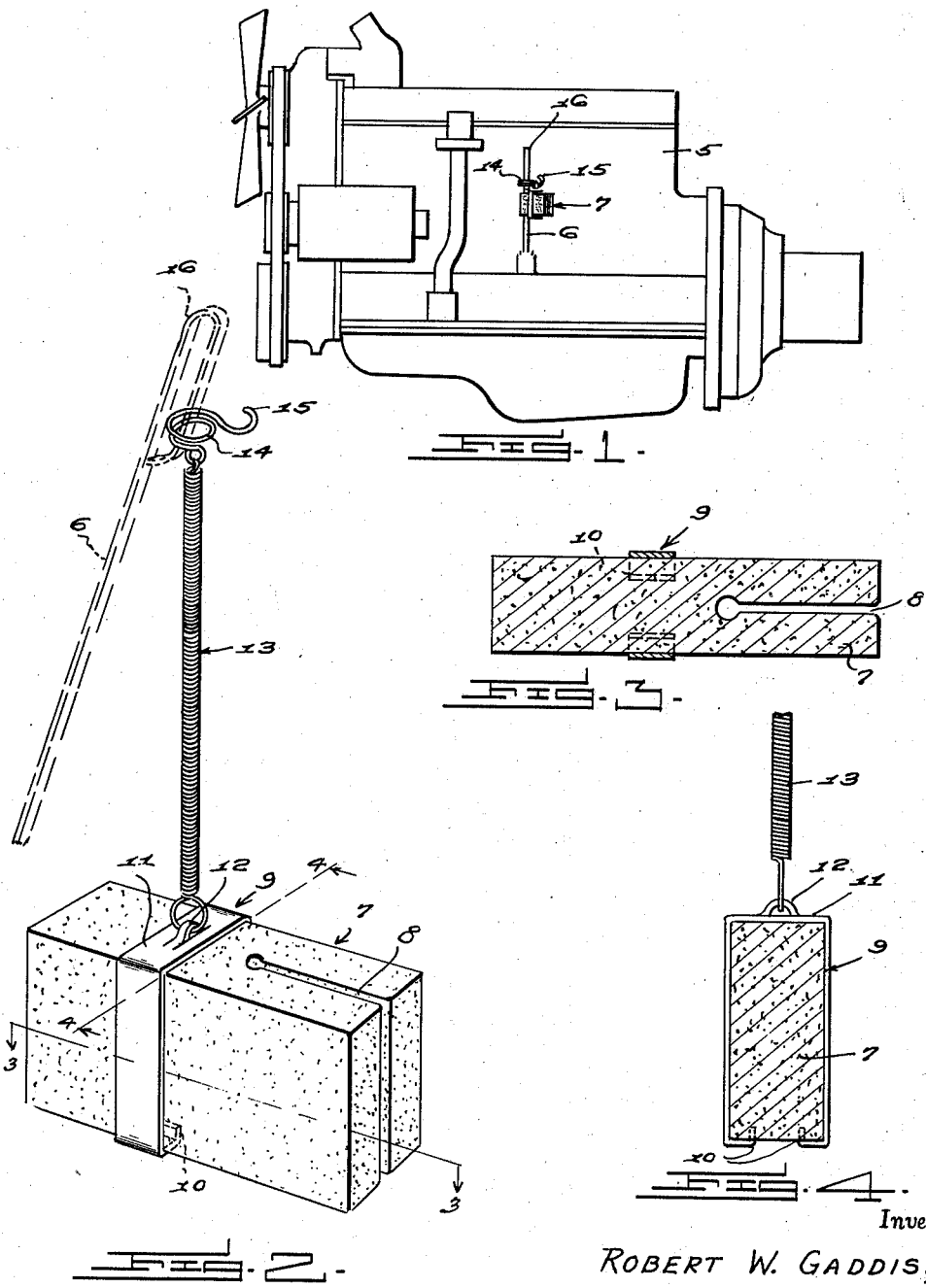

2,253,269

UNITED STATES PATENT OFFICE 2,253,269

WIPER

Robert W. Gaddis, Poughkeepsie, N. Y.

Application March 8, 1940, Serial No. 323,006

1 Claim. (Cl. 15—210)

This invention relates to a wiper for oil gauge rods of internal combustion engines, and has for the primary object the provision of a device of this character which may be readily installed on the handle end of a gauge rod and may be easily brought into position for wiping oil from the gauge rod and normally, or when not in use, will be so positioned as to not interfere with the workings of any of the parts of the engine and will be free of contact with oil or grease which may be on the engine and still be exposed to air currents and heat from the engine for rapid drying thereof.

With these and other objects in view, the invention consists in certain novel features of construction, combination and arrangement of parts to be hereinafter more fully described and claimed.

For a complete understanding of my invention, reference is to be had to the following description and accompanying drawing, in which—

Figure 1 is a side elevation illustrating an internal combustion engine with the present invention installed on the oil gauge rod of the engine.

Figure 2 is a perspective view illustrating the wiper and its connection with a gauge rod.

Figure 3 is a sectional view taken on the line 3—3 of Figure 2.

Figure 4 is a transverse sectional view taken on the line 4—4 of Figure 2.

Referring in detail to the drawing, the numeral 5 indicates an internal combustion engine and 6 the oil gauge rod of the engine. Most engines are equipped with a gauge rod which is pulled from the engine for the purpose of ascertaining the amount of oil within the engine. It is a known fact that the gauge rod after being removed from the engine must be wiped off and reinserted and then again removed in order to obtain a correct reading. This necessitates the attendant having in his possession something on which to wipe the rod. It is proposed through the use of the present invention to eliminate waste of time and the necessity of the attendant having to carry waste materials or a wiping cloth in order to properly test the amount of oil in an engine and which also will eliminate fire hazards attached to such practice of the attendant having oil soaked rags, waste materials or the like in his possession or about the service station.

A wiping element is indicated by the character 7 and may be of various shapes, preferably of substantially rectangular shape, as shown in Figure 2, and has formed therein a slot 8 which opens outwardly through upper and lower faces and one end of the wiper element for the purpose of permitting the gauge rod 6 to be readily passed through the wiper element. The slot 8 forms in the wiper element a bifurcated end portion which, as before stated, will permit the passing of a gauge rod through the wiper element and by squeezing the bifurcated end portion of the wiper it will efficiently remove oil from the gauge rod as the latter is withdrawn from the wiper element. It is preferable that the wiper element be constructed of an absorbent and fireproof material.

A substantially U-shaped clamp 9 embraces the wiper element and includes angularly related end portions 10 adapted to bite into the wiper element for retaining the clamp thereon. The connecting portion 11 of the clamp has struck therefrom an eye 12 to which an elastic element 13 is connected. This elastic element may be of different constructions, however, a coil spring is found to be very satisfactory. The free end of the flexible element has connected thereto a split ring element 14 including a hook 15. The split ring element may be readily adapted to the handle end 16 of the gauge rod 6, as shown in Figure 2, and under normal conditions the eye 12 is brought into engagement with the hook 15 for supporting the wiper element well upwardly on the gauge rod and out of the way of any moving part of the engine as well as any grease or dirt that may be about the base of the engine.

To use the device, the eye 12 is removed from the hook and the elastic element will permit the wiper element to be readily moved along the rod for the purpose of removing oil therefrom, it being understood that the rod is positioned in the slot 8 of the wiper. After the use of the device the eye is returned to the hook so as to support the wiper out of the way and in position to receive air currents and heat from the engine to bring about rapid drying of the wiper element.

It is believed that the foregoing description, when taken in connection with the drawing, will fully set forth the construction and advantages of this invention to those skilled in the art to which such a device relates, so that further detailed description will not be required.

Having thus described the invention, what I claim is:

In a wiper support, a coil spring, an eye formed on one end of said spring, a wiping element connected with said eye, a coil member adapted to pass through a handle of a gauge rod and having one end secured to the other end of the spring and having the other end thereof extended and bent to form a hook to engage the eye for removably supporting the wiper element in close proximity to the handle of the gauge rod.

ROBERT W. GADDIS.